(12) United States Patent
Emmann et al.

(10) Patent No.: US 6,227,628 B1
(45) Date of Patent: May 8, 2001

(54) SERVICE BRAKE FOR A VEHICLE

(75) Inventors: Siegfried Emmann, Weinstadt; Christian Mosler, Stuttgart; Werner Spielmann, Burgstetten, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/320,843

(22) Filed: May 26, 1999

(30) Foreign Application Priority Data

May 26, 1998 (DE) ................................. 198 23 395
Jul. 29, 1998 (DE) ................................. 198 34 128

(51) Int. Cl.[7] ............................................ B60T 8/42
(52) U.S. Cl. ........................... 303/115.3; 303/4; 303/15; 303/114.1; 303/33
(58) Field of Search ................. 303/4, 15, 114.1, 303/33, 54, 62, 12, 115.1, 115.2, 115.3

(56) References Cited

U.S. PATENT DOCUMENTS

| | | | |
|---|---|---|---|
| 4,815,792 | * 3/1989 | Troster | 303/113 |
| 4,861,119 | * 8/1989 | Zivkovic | 303/116 |
| 4,877,296 | * 10/1989 | Leiber et al. | 303/116 |
| 4,890,891 | * 1/1990 | Leiber | 303/115 |
| 4,964,681 | * 10/1990 | Burgdorf et al. | 303/116 |
| 5,259,195 | 11/1993 | Pringle . | |

FOREIGN PATENT DOCUMENTS

| | | |
|---|---|---|
| 37 35 453 | 5/1989 | (DE) . |
| 38 06 789 | 9/1989 | (DE) . |
| 197 05 653 | 8/1998 | (DE) . |
| WO 89/09713 | 10/1989 | (WO) . |

* cited by examiner

Primary Examiner—Robert J. Oberleitner
Assistant Examiner—Devon Kramer
(74) Attorney, Agent, or Firm—Evenson, McKeown, Edwards & Lenahan, P.L.L.C.

(57) ABSTRACT

A service brake for a vehicle, having two brake circuits which can be acted upon by pressurized fluid by way of a vacuum brake booster and a dual brake master cylinder, has at least one switchable device for changing the hydraulic pressure intensification by which, in the event of a failure of the brake booster, the pressure of the brake fluid is increased in each of the two brake circuits.

17 Claims, 3 Drawing Sheets

SERVICE BRAKE FOR A VEHICLE

BACKGROUND AND SUMMARY OF THE INVENTION

This application claims the priority of German Application Nos. 198 23 395.7, filed May 26, 1998 and 198 34 128.8, filed Jul. 29, 1998, the disclosures of which are expressly incorporated by reference herein.

The invention relates to a service brake for a vehicle having two brake circuits which are acted upon by pressurized fluid via a vacuum brake booster and a dual brake master cylinder.

Service brakes of this type have been used for some time in virtually all passenger cars and smaller utility vehicles. In this case, the vacuum brake boosters are designed such that, in the event of a failure of the vacuum, a direct coupling is possible between a piston connected with a brake pedal and the piston of the dual brake master cylinder. As a result of this coupling, the vehicle can still be braked in this emergency situation.

A problem in such emergency situations is that only limited brake pedal forces can be applied by a person operating the brake pedal. This is particularly true if, for reasons of comfort, the pedal travels were dimensioned to be short in the case of a power-assisted braking operation. For this reason, in emergency situations, only vehicles up to approximately 6 tons total weight can be braked safely. For heavy vehicles, such an emergency braking function of the service brake is no longer sufficient.

It is an object of the present invention to further develop a service brake for a vehicle of the above-mentioned type such that in the event of a failure of the vacuum brake booster, a reliable braking of the vehicle is possible even in the case of heavier vehicles. In particular, braking is to be permitted which meets the minimum legal requirements concerning the deceleration of the vehicle during a braking operation.

In the case of a service brake for a vehicle of the above-mentioned type, this object is achieved in that at least one triggerable, switchable device is provided for changing the hydraulic pressure intensification by which, in the event of a failure of the vacuum brake booster, the pressure of the fluid is increased in each of the two brake circuits.

By means of the triggerably switchable device for changing the hydraulic pressure intensification, which increases the pressure of the fluid in the event of a failure of the vacuum brake booster in both brake circuits, an increase of the pressure existing in both brake circuits is permitted in an emergency situation in a particularly simple manner.

As far as the construction of the device for changing the hydraulic pressure intensification is concerned, purely in principle, the most varied embodiments are described here. In an advantageous embodiment, the at least one device for changing the hydraulic pressure intensification is in each case a step piston cylinder unit which is connected behind the dual circuit brake booster in each of the two brake circuits. This embodiment has the particularly important advantage wherein a retrofitting of existing service brakes is possible without changing the brake booster and/or the dual brake master cylinder.

In this case, it is preferably provided that each step piston cylinder unit has a step piston which is stepped on the input side.

The switching-over of the step piston cylinder units advantageously takes place by an electrically triggerable valve.

The valve is preferably a 3/2-way valve by which, in its one switching position, an input volume of the step piston cylinder unit can be connected with an input-side ring volume. In its other switching position, an output volume can be connected with the input-side ring volume of the step piston cylinder unit. Thus, by a switch-over of the ring volume between the input-side input volume and the larger output-side output volume, an increase of the hydraulic pressure intensification can be achieved in a particularly simple manner.

In the case of another very advantageous embodiment, the at least one device for changing the hydraulic pressure intensification is a step piston cylinder unit which is connected in front of the dual brake master cylinder and which can be switched over by way of an electrically triggerable valve. In this embodiment, only one step piston cylinder unit is still required, whereby the technical expenditures and costs can be reduced.

A particularly advantageous embodiment has the step piston cylinder unit part of the dual brake master cylinder. This permits a further minimizing of the required number of components of the service brake of the vehicle.

The relationship of the fluidically active surfaces of the step piston cylinder unit can be constructed such that the effective surface of the non-stepped portion of the step piston cylinder unit is approximately as large as the effective surface of the dual brake master cylinder. These surfaces are larger than the surface of the stepped portion of the step piston cylinder unit so that a hydraulic pressure intensification becomes operative.

In another advantageous embodiment, the effective surface of the dual brake master cylinder is approximately as large as the effective surface of the stepped portion of the step piston cylinder unit. Both effective surfaces are smaller than the fluidically effective surface of the non-stepped portion of the step piston cylinder unit. In this embodiment, only one bore is required for manufacturing the dual brake master cylinder and the stepped portion of the step piston cylinder unit which is part of the dual brake master cylinder. This considerably reduces the manufacturing expenditures and manufacturing costs.

The valve is preferably a 3/2-way valve by which, in one switching condition, an output volume can be connected with an output-side ring volume of the step piston cylinder unit and by which, in its other switching position, the output-side ring volume can be connected with an input volume. In a simple manner, this again permits increasing the hydraulic pressure intensification.

Other objects, advantages and novel features of the present invention will become apparent from the following detailed description of the invention when considered in conjunction with the accompanying drawings.

DETAILED DESCRIPTION OF THE DRAWINGS

The basic idea of the invention is to arrange in the brake fluid circulating system of the service brake a hydraulic pressure intensification device by which, in the event of a failure of the vacuum brake booster, an increase of the pressure is caused in the hydraulic fluid or in the brake fluid of the brake via a hydraulic pressure intensification. In this manner, by operating the brake pedal without any significant enlargement of the pedal travel, a higher braking effect is achieved in the event of a failure of the brake booster, whereby particularly heavy vehicles can also be reliably braked in emergency situations.

Figure 1:
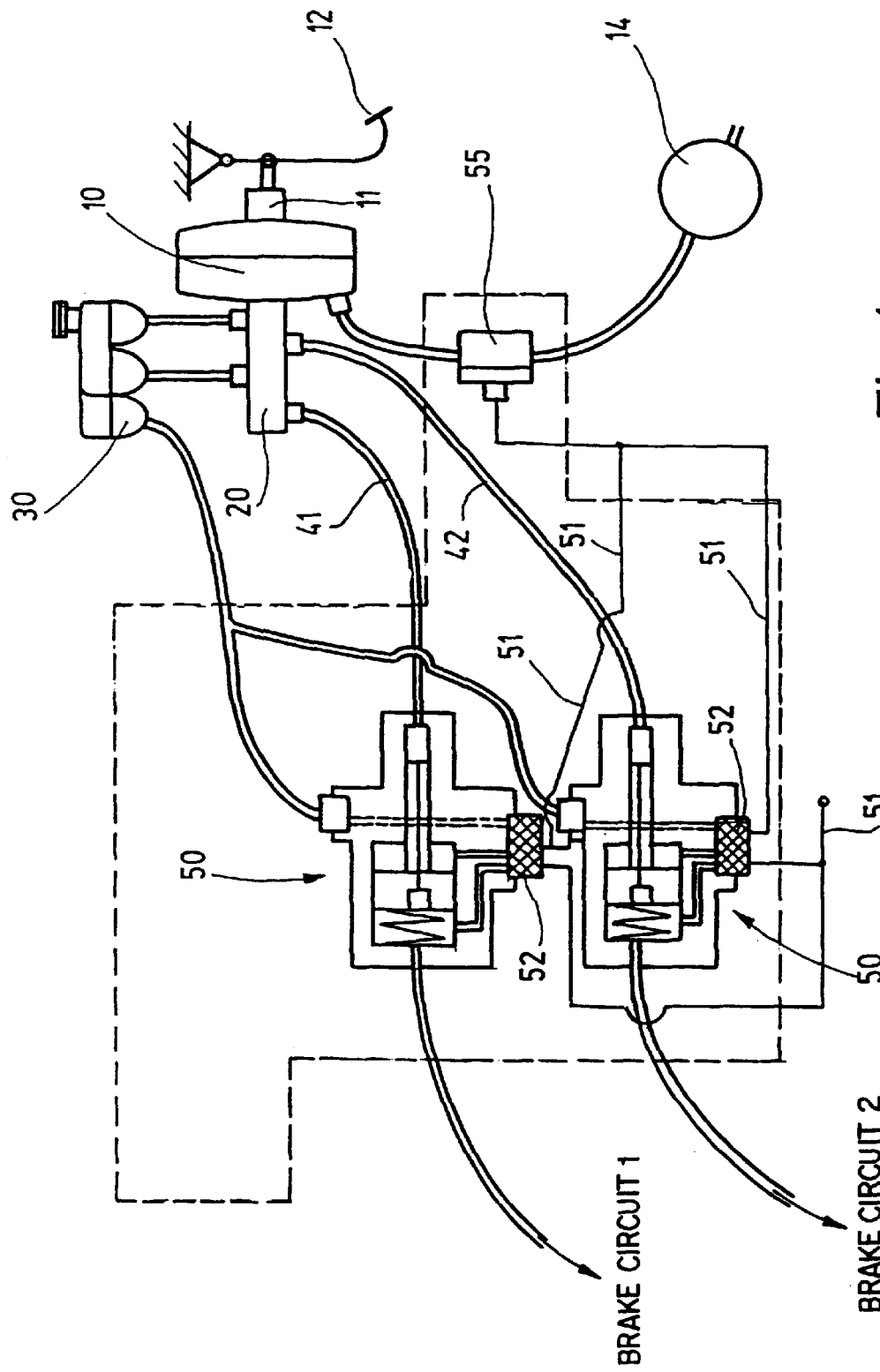
FIG. 1 is a schematic view of a first embodiment of a vehicle service brake according to the invention.

A vehicle service brake illustrated in FIG. 1 comprises a vacuum brake booster 10 which is known per se. A piston rod 11 of the vacuum brake booster 10 is connected with a brake pedal 12. Movement of the brake pedal 12 operates a dual brake master cylinder 20. The master cylinder 20 is boosted by the vacuum brake booster 10 and is fluidically connected with a brake fluid reservoir 30. By way of lines 41, 42, the dual brake master cylinder 20 is fluidically connected with a first brake circuit 1 and a second brake circuit 2 (not shown).

In each of the two hydraulic lines 41, 42, a step piston cylinder unit 50 is provided. The units 50 can be switched over by way of a valve 52 which can be electrically triggered by way of electric lines 51 between a position with a lower hydraulic pressure intensification and a position with a higher hydraulic pressure intensification. The electric signal lines 51 are connected with a switching contact 55. The contact 55 is switched such that, in the event of a failure of the vacuum pump 14, a switch-over of the step piston cylinder unit 50 takes place such that the pressure of the fluid, that is, of the brake fluid, is increased in each of the two brake circuits 1 and 2 and the braking effect of the two brake circuits 1 and 2 is therefore intensified.

Figure 2:
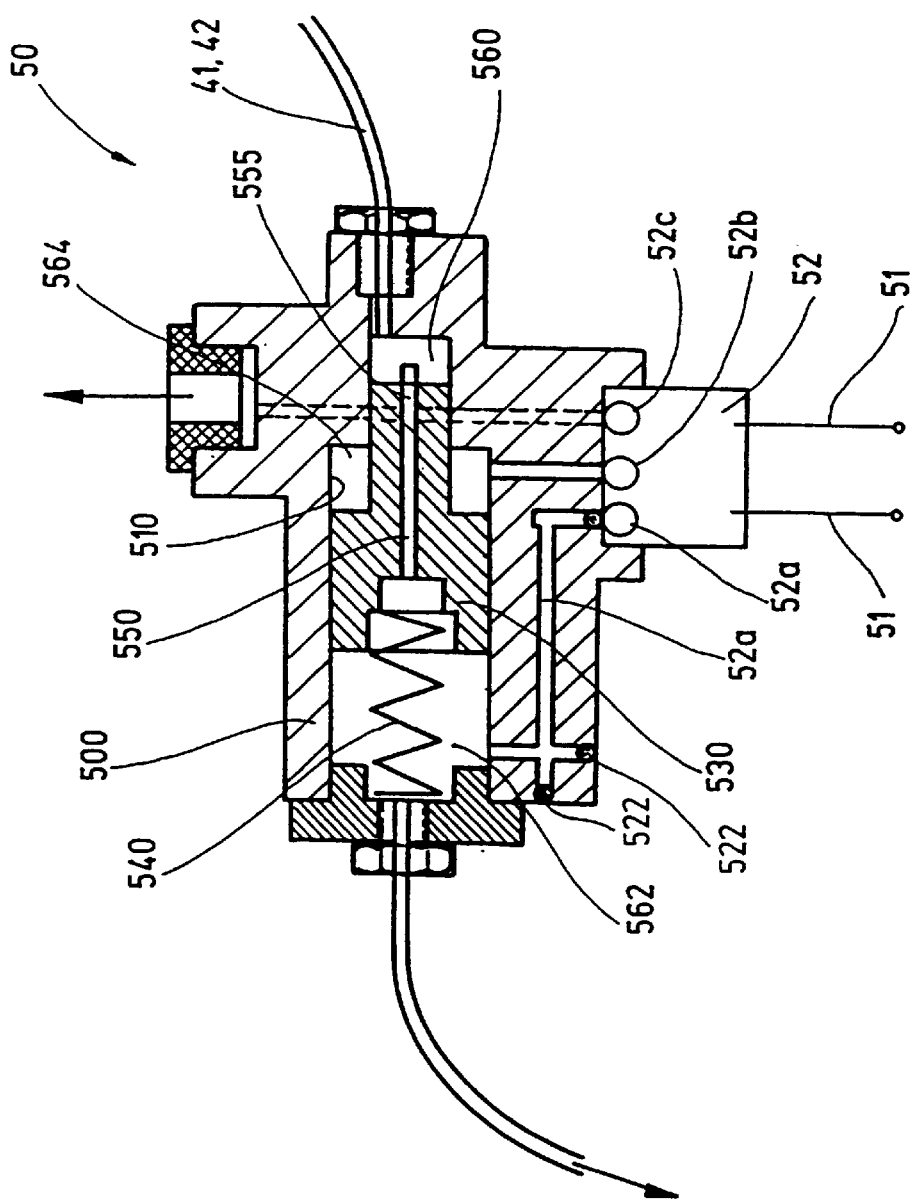
FIG. 2 is a schematic sectional view of a step piston cylinder unit of the vehicle service brake illustrated in FIG. 1.

A step piston cylinder unit 50 is schematically illustrated in FIG. 2. The step piston cylinder unit comprises a housing 500 in which a stepped bore 510 is provided. In this bore 510, a step piston 530 is axially displaceably guided against the restoring force of a restoring spring 540. The step piston cylinder unit 50 can be switched over by way of a 3/2-way valve 52 which can be triggered by way of electric signal lines 51.

The step piston 530 of the step piston cylinder unit 50 has an axial bore in which a bottom valve 550 is arranged. During displacement of the step piston 530 by means of the restoring spring 540, the bottom valve 550 is pressed against a stop surface in the step piston 530 such that it closes the bore in the step piston 530. An operating pin 555 of the bottom valve 550 projects beyond the step piston 530 on its stepped side such that, when the step piston 530 impacts the housing, it strikes against the wall of the bore 510 in the housing 500 situated opposite it and thereby opens up the bottom valve 550. As a result of such an opening of the bottom valve 550, a fluidic connection of an input volume 560 of the step piston 530 with an output volume 562 is permitted.

As illustrated in FIG. 2, the 3/2-way valve 52 is connected by way of three hydraulic lines 52a, 52b and 52c with the step piston cylinder unit 50. In this case, line 52a leads into the output volume 562 of the step piston cylinder unit 50, whereas line 52b leads into a ring volume 564 of the step piston cylinder unit. Line 52c is connected with the brake fluid reservoir 30 which is used as a compensation reservoir. The lines are produced in a simple manner, for example, by bores in the housing 500. The inputs of the bores are closed by closing elements 522, preferably balls, if, as in the case of line 52, the lines extend in a bent manner.

When a vacuum is now generated by the vacuum pump 14 and the brake booster 10 functions properly, the 3/2-way valve 52 is in a first switching stage in which line 52b is connected with line 52c. In this switching stage, the ring volume 564 of the step piston cylinder unit 50 is therefore connected with the compensation reservoir 30. When the input volume 560 is now acted upon by pressurized fluid, only the small end surface of the step piston 530 is acted upon because the ring surface of the step piston 530 is not hydraulically active in the ring volume 564 due to the connection with the compensation reservoir 30. Now, because the surface of the step piston 530 in the output volume 562 is larger than the piston surface of the step piston 530 in the input volume 560, the output pressure, which exists on the wheel brakes, is lower than the input pressure situated in the hydraulic lines 41, 42 in this switching stage of the 3/2 way valve. In other words, in this switching stage, a hydraulic reduction is implemented by the step piston cylinder unit 50.

In the event of a failure of the vacuum brake booster 10, that is, if, for example, the vacuum pump 14 fails, which is detected by the switching contact 55, the 3/2-way valve 52 is switched into a second switching stage in which line 52a is connected with line 52b.

In this position, the output volume 562 is connected with the ring volume 564. When the input volume 560 is now acted upon by pressurized fluid from the hydraulic lines 41, 42, in addition to the surface of the stepped portion of the step piston 530 active in the input volume 560, the ring surface in the ring volume 564 of the step piston 530 is also active. Together, both surfaces correspond to the surface of the step piston in the output volume 562, which implements a 1:1 intensification of the step piston cylinder unit in this switching stage.

Relative to the above-described first switching stage, this 1:1 intensification represents a higher intensification because, in switching stage 1—as described above—a reduction is implemented. Therefore, in the event of a failure of the vacuum brake booster 10, while the pedal travel is comparable, a higher hydraulic pressure is generated in the output line leading to the wheel brakes, compared with the hydraulic pressure which is applied to the wheel brakes in the case of a normal operating mode, that is, when the vacuum brake booster 10 is intact. In other words, while the pedal travel is comparable, the braking force is increased in the event of a failure of the vacuum brake booster 10. While the pedal travels are comparable, on the basis of Pascal's Law, such an increase is possible only by a hydraulic pressure intensification device as represented by the step piston cylinder unit because, when the step piston cylinder unit 50 is eliminated, an increase of the pressure requires an enlargement of the pedal travel, which cannot easily be implemented with vehicles.

It is a significant advantage of the above-described embodiment that it can easily be retrofitted in existing vehicles merely by installing the step piston cylinder unit 50 in the hydraulic lines 41, 42 and by arranging the switching contact 55 in the vacuum circulation system.

Figure 3:
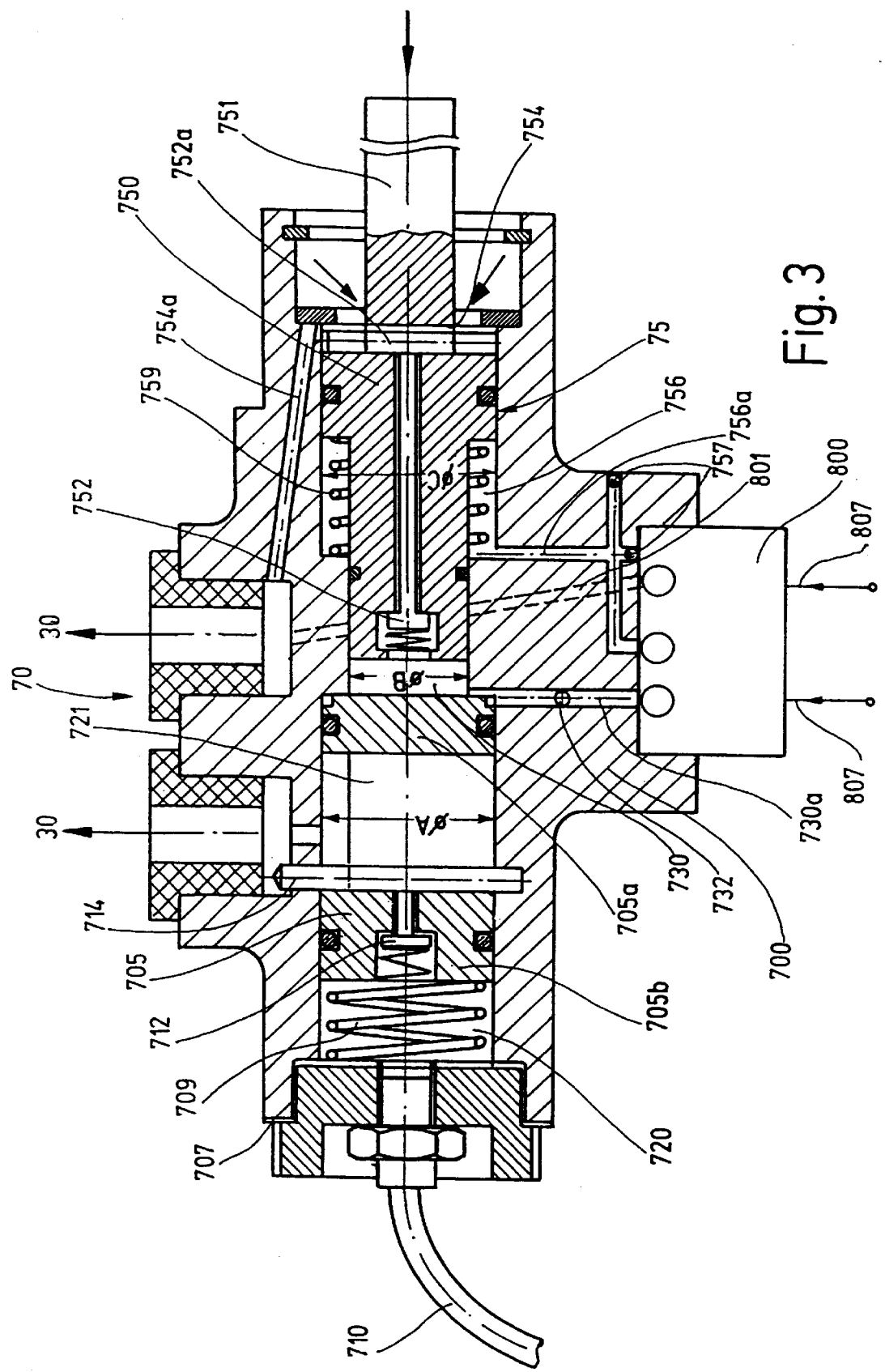
FIG. 3 is a schematic sectional view of an embodiment of a dual brake main cylinder which can be used in a vehicle service brake according to the invention and has devices for the hydraulic pressure intensification which are integrated in the dual brake main cylinder.

In another embodiment of an advantageous service brake according to the invention, a dual brake master cylinder 70 with a pressure intensification hydraulic system is used, as schematically illustrated in FIG. 3.

As illustrated in FIG. 3, the dual brake master cylinder 70 has a housing 700 in which, in a manner known per se, a piston 705 is arranged in a bore and is sealed off against the bore by means of seals 707. The piston 705 is axially displaceable against the restoring force of a restoring spring 709. The piston 705 has an intermediate or floating piston part 705a and an output-side piston part 705b. A bottom valve 712 is arranged in the piston 705 (known per se and described above) and whose operating rod, in the inoperative position of the piston 705, strikes against a pin 714 fastened in the housing 700 perpendicularly to the piston movement. This and thus establishes a connection of an output volume 720 of the dual brake main cylinder 70 with the compensation reservoir 30 by way of an intermediate volume 721. By means of this fluidic connection, the output volume 720 is acted upon by hydraulic fluid. The bottom valve 712 is also called a "snifting valve". A first brake circuit is connected with the output volume 720 via a fluid line 710.

In addition to the output volume 720, another, second output volume 730 is provided in the dual brake master cylinder and is connected by way of a connection 732 with the second brake circuit. By axially displacing the piston 705 of the dual brake main cylinder 70, the two brake circuits are acted upon by pressurized fluid in a manner known per se.

A step piston cylinder unit 75 is connected in front of this dual brake master cylinder. The step piston cylinder unit 75 has a pressure rod piston 750, which is connected by way of a pressure rod 751 with the piston rod of the brake booster, so that a pedal force can be transmitted by way of the pressure rod 751 to the pressure rod piston 750. The pressure rod piston 750 has a bottom or snifting valve 752 whose operating rod, in the inoperative position of the step piston cylinder unit 75, strikes against a pin 752a fastened in the housing 700 perpendicularly to the piston movement and permits a fluidic connection of an input volume 754 of the dual brake main cylinder 70 with its second output volume 730. As a result, this second output volume 730 can be acted upon by fluid. The step piston cylinder unit 75 comprises the following effective volumes: the input volume 754, a ring volume 756 and the second output volume 730.

The input volume 754 is connected by way of a hydraulic line 754a with the compensation reservoir 30. By way of a line 756a, which is closed in each case on the end side by closing devices 757, preferably balls, the ring volume 756 is connected with an inlet of a 3/2-way valve 800. Another inlet of the 3/2-way valve 800 is connected by way of another line 801 with the compensation reservoir. A third connection of the 3/2 way valve 800 is connected by way of a hydraulic line 730a with the second output volume 730 of the dual brake main cylinder 70. As described above, the connection 732 for one of the two brake circuits also leads into this line 730a.

In the stepped bore, the stepped pressure rod piston 750 can axially move in the housing 700 against the restoring force of a restoring spring 759.

The above-described dual brake main cylinder operates as follows. In a first switching stage of the 3/2-way valve 800, which can be triggered by way of electric signal lines 807 (the first switching stage being always switched on when the braking force is boosted by the vacuum brake booster—in other words, when the vacuum pump 14 has no defect) line 730a is connected by way of the 3/2-way valve with line 756a. In this switching stage, the ring volume 756 of the step piston cylinder unit 75 is therefore connected with the second output volume 730 of the dual brake master cylinder 70. In this switching position, current flows through the 3/2-way valve 800. As a result of the connection of the second output volume 730 of the dual brake master cylinder 70 with the ring volume 756 of the step piston cylinder unit 75, a hydraulic reduction is implemented in this switching stage of the 3/2-way valve 800 since the surface θC of the step piston cylinder unit 75, which is active in this switching stage, is larger than the effective surface of the stepped pressure rod piston 750 in the second output volume 730 θB and since the surface θA of the two-part piston 705 of the dual brake master cylinder 70 corresponds approximately to the total surface θC of the step piston cylinder unit 75 active in this switching stage.

The surface θA of the two-part piston 705 of the dual brake main cylinder 70 may also be as large as the surface θB of the stepped pressure rod piston 750 (not shown). This embodiment permits a particularly simple manufacturing of the dual brake main cylinder 70 because in this case only a simple bore is required in the housing 700 of the main brake cylinder 70.

If now, as a result of the failure of, for example, the vacuum pump 14 or for any other reason, the vacuum fails in the vacuum brake booster, which is detected by the switching contact 55, the 3/2 way valve 800 is switched over into its second switching stage, which preferably takes place electromagnetically. In this second switching stage, lines 756a and 801 are connected. In this switching stage, the annulus 756 is therefore connected with the compensation reservoir 30. If the pressure rod piston 750 of the step piston cylinder unit 75 is now acted upon by a force, in comparison to the pressure existing in the above-described first switching stage, a higher pressure exists in the second output volume 730 because the effective surface θB of the step piston cylinder unit 75 is smaller than the effective surface θA of the step piston cylinder unit 75. In other words, in the event of a failure of the vacuum brake booster, an increased pressure exists in the two brake circuits compared with the pressure which is present during a normal operating mode of the vacuum brake booster. In this second switching stage, the 3/2-way valve 800 is preferably currentless.

In both above-described embodiments of a service brake, in the event of a failure of the vacuum brake booster, a higher pressure is applied to the wheel brakes compared with the pressure which is applied to the wheel brakes in the case of a proper functioning of the vacuum brake booster. The higher pressure is implemented by hydraulic pressure intensification devices in the form of the step piston cylinder units. As the result of this hydraulic pressure intensification, lower pedal forces must be used in an emergency situation compared with the pedal forces which must be used if such hydraulic pressure intensification devices in the form of the step piston cylinder units did not exist. The pedal travels to be carried out are essentially unchanged (not enlarged) in this case.

What is claimed is:

1. A vehicle service brake, comprising:
   a vacuum brake booster;
   a dual brake master cylinder coupled with said vacuum brake booster;
   first and second brake circuits acted upon via pressurized fluid by way of the vacuum brake booster and the dual brake master cylinder;
   at least one switchable device operatively coupled with said first and second brake circuits to change a hydraulic pressure intensification by which, in an event of a failure of the vacuum brake booster, a brake fluid pressure is increased in each of the first and second brake circuits, wherein said at least one switchable device comprises step piston cylinder units connected fluidically downstream of the dual brake master cylinder and the first and second brake circuits, respectively and wherein the service brake further comprises an electrically triggerable valve operatively coupled with said step piston cylinder units to switch-over said units, wherein said electrically triggerable valve is a 3/2-way valve by which, in one switching position an input volume is connectable with an input-side ring volume of the step piston cylinder unit and, in another switching position, an output volume is connectable with the ring volume of the step piston cylinder unit.

2. The vehicle service brake according to claim 1, wherein each of said step piston cylinder units includes a step piston having its step on an input-side.

3. The vehicle service brake according to claim 2, further comprising an electrically triggerable valve operatively coupled with said step piston cylinder units to switch-over said units.

4. The vehicle service brake according to claim 3, wherein said electrically triggerable valve is a 3/2-way valve by which, in one switching position an input volume is connectable with an input-side ring volume of the step piston cylinder unit and, in another switching position, an output volume is connectable with the ring volume of the step piston cylinder unit.

5. A vehicle service brake, comprising:
a vacuum brake booster;
a dual brake master cylinder coupled with said vacuum brake booster;
first and second brake circuits acted upon via pressurized fluid by way of the vacuum brake booster and the dual brake master cylinder,
at least one switchable device operatively coupled with said first and second brake circuits to change a hydraulic pressure intensification by which, in an event of a failure of the vacuum brake booster, a brake fluid pressure is increased in each of the first and second brake circuits,
wherein said at least one switchable device to change the hydraulic pressure intensification comprises a step piston cylinder unit operatively coupled fluidically upstream of the dual brake master cylinder, said step piston cylinder unit being switched-over via an electrically controllably valve, wherein said step piston cylinder unit has a pressure rod piston stepped on an output-side.

6. The vehicle service brake according to claim 5, wherein said step piston cylinder unit is formed as part of the dual brake master cylinder.

7. The vehicle service brake according to claim 5, wherein a fluidically active surface of a non-stepped portion of the step piston cylinder unit is approximately as large as a fluidically active surface of the dual brake master cylinder, and further wherein these surfaces are larger than a fluidically active surface of a stepped portion of the step piston cylinder unit.

8. The vehicle service brake according to claim 5, wherein a fluidically active surface of the dual brake master cylinder is approximately as large as a fluidically active surface of a stepped portion of the step piston cylinder unit, and further wherein these two surfaces are smaller than a fluidically active surface of a non-stepped portion of the step piston cylinder unit.

9. The vehicle service brake according to claim 5, wherein the electrically controllable valve is a 3/2-way valve which, in one switching position, connects an output volume of the dual brake master cylinder with an output-side ring volume of the step piston cylinder unit and which, in another switching position, connects the output-side ring volume of the step piston cylinder unit with an input volume.

10. A vehicle service brake, comprising:
a vacuum brake booster;
a dual brake master cylinder coupled with said vacuum brake booster;
first and second brake circuits acted upon via pressurized fluid by way of the vacuum brake booster and the dual brake master cylinder,
at least one switchable device operatively coupled with said first and second brake circuits to chance a hydraulic pressure intensification by which, in an event of a failure of the vacuum brake booster, a brake fluid pressure is increased in each of the first and second brake circuits,
wherein said at least one switchable device to change the hydraulic Pressure intensification comprises a step piston cylinder unit operatively coupled fluidically upstream of the dual brake master cylinder, said step pistons cylinder unit being switched-over via an electrically controllably valve, wherein said step piston cylinder unit is formed as part of the dual brake master cylinder.

11. The vehicle service brake according to claim 10, wherein a fluidically active surface of a non-stepped portion of the step piston cylinder unit is approximately as large as a fluidically active surface of the dual brake master cylinder, and further wherein these surfaces are larger than a fluidically active surface of a stepped portion of the step piston cylinder unit.

12. The vehicle service brake according to claim 10, wherein a fluidically active surface of a non-stepped portion of the step piston cylinder unit is approximately as large as a fluidically active surface of the dual brake master cylinder, and further wherein these surfaces are larger than a fluidically active surface of a stepped portion of the step piston cylinder unit.

13. The vehicle service brake according to claim 10, wherein a fluidically active surface of the dual brake master cylinder is approximately as large as a fluidically active surface of a stepped portion of the step piston cylinder unit, and further wherein these two surfaces are smaller than a fluidically active surface of a non-stepped portion of the step piston cylinder unit.

14. The vehicle service brake according to claim 10, wherein a fluidically active surface of the dual brake master cylinder is approximately as large as a fluidically active surface of a stepped portion of the step piston cylinder unit, and further wherein these two surfaces are smaller than a fluidically active surface of a non-stepped portion of the step piston cylinder unit.

15. The vehicle service brake according to claim 10, wherein the electrically controllable valve is a 3/2-way valve which, in one switching position, connects an output volume of the dual brake master cylinder with an output-side ring volume of the step piston cylinder unit and which, in another switching position, connects the output-side ring volume of the step piston cylinder unit with an input volume.

16. A vehicle service brake, comprising:
a vacuum brake booster;
a dual brake master cylinder coupled with said vacuum brake booster;
first and second brake circuits acted upon via pressurized fluid by way of the vacuum brake booster and the dual brake master cylinder,
at least one switchable device operatively coupled with said first and second brake circuits to change a hydraulic pressure intensification by which, in an event of a failure of the vacuum brake booster, a brake fluid pressure is increased in each of the first and second brake circuits, wherein said at least one switchable device to change the hydraulic pressure intensification comprises a step piston cylinder unit operatively coupled fluidically upstream of the dual brake master cylinder, said step Pistons cylinder unit being switched-over via an electrically controllably valve, wherein the electrically controllable wherein the electrically controllable valve is a 3/2-way valve which, in one switching position, connects an output volume of the dual brake master cylinder with an output-side ring volume of the step piston cylinder unit and which, in another switching position, connects the output-side ring volume of the step piston cylinder unit with an input volume.

17. A step piston cylinder unit for changing hydraulic pressure in a brake circuit of a vehicle brake system, the step piston cylinder unit comprising:

a housing having an axial bore with a radial step;

a piston arranged in said axial bore, said piston having a corresponding radial step, the housing and piston forming an input volume coupleable with the vehicle brake system, a ring volume arranged around the reduced diameter portion of the piston, and an output volume coupleable with the brake circuit;

an electrically triggerable valve coupled with the step piston cylinder unit to switch-over operation of the step piston cylinder unit such that, in a first switching position, the input volume is connected with the ring volume and, in a second switching position, the output volume is connected with the ring volume.

* * * * *